United States Patent [19]

Vrablik

[11] 3,818,459

[45] June 18, 1974

[54] AUXILIARY MEMORY INTERFACE SYSTEM

[75] Inventor: Edward A. Vrablik, Stow, Mass.

[73] Assignee: Dimensional Systems, Inc., Lexington, Mass.

[22] Filed: Dec. 19, 1972

[21] Appl. No.: 316,524

[52] U.S. Cl. .............................................. 340/172.5
[51] Int. Cl. .............................................. G06f 13/06
[58] Field of Search ...................... 340/172.5; 444/1

[56] References Cited

UNITED STATES PATENTS

| | | | |
|---|---|---|---|
| 3,461,433 | 8/1969 | Emerson | 340/172.5 |
| 3,703,708 | 11/1972 | Foster | 340/172.5 |
| 3,725,874 | 4/1973 | Van Heel | 340/172.5 |

*Primary Examiner*—Paul J. Henon
*Assistant Examiner*—John P. Vandenburg
*Attorney, Agent, or Firm*—Joseph S. Iandiorio

[57] ABSTRACT

An interface apparatus for coupling an auxiliary memory of N pages to a central processing unit already containing M pages of memory. An address modification circuit transfers memory addresses from the central processing unit to the auxiliary memory and a subtractor, within the address modification circuit, subtracts M from the page number portions of the addresses to provide modified page numbers. The auxiliary memory responds to modified page numbers of greater than 0 and less than N+1.

20 Claims, 4 Drawing Figures

AUXILIARY MEMORY INTERFACE SYSTEM

FIELD OF INVENTION

This invention relates to a modular auxiliary memory system for increasing the memory capacity of a computer, and more particularly to such an auxiliary memory system having an interface apparatus which controls a number of individual memory units.

BACKGROUND OF INVENTION

In many conventional computers the system is designed so that extra memory can be added on in modular units to increase the memory capacity of the system as the need arises, one unit at a time. This is desirable to maintain a low initial cost to permit small computers with limited memory capacity to appeal to a much broader market of users but yet enable the computer to expand to meet the greater needs of large users and to meet the needs of the smaller users as their needs grow. In one type of so called minicomputer these units are called pages and with each page of memory added a separate control unit is required to recognize and respond to addresses directed to its page. Such an arrangement, which requires a control circuit for each page of memory tends to be overly expensive in terms of cost and space and adds to the complexity of the system as a whole.

SUMMARY OF INVENTION

It is therefore an object of this invention to provide a modular memory system in which one control unit or interface apparatus controls a number of memory units or pages.

It is a further object of this invention to provide such an interface unit which discriminates between addresses which are within and without the expanded capacity of the auxiliary memory system and renders the auxiliary memory system nonresponsive to requests for addresses not contained therein.

It is still a further object of the invention to provide an interface apparatus that acts as a buffer and delays the passage of computer commands to the auxiliary memory when it is busy.

This invention results from the realization that smaller, less complex and less expensive auxiliary memory systems can be provided using an interface apparatus which services a number of auxiliary memory units by discriminating between addresses within those memory units serviced and those without and converting those addresses within the capacity of those units to be recognizable by those units and preventing response to addresses not within the capacity of those memory units.

This invention features an interface apparatus for coupling an auxiliary memory of N pages to a central processing unit already including memory pages numbered up to M. An address modification apparatus within the interface equipment transfers memory requests from the central processing unit to the auxiliary memory. A subtractor within the address modification apparatus subtracts M from the page number portion of the memory addresses to provide modified page numbers to which the auxiliary memory responds. For example, consider a central processing unit wherein the highest numbered memory page is 5. (It is immaterial whether the pages in the central processing unit begin with 0 or 1. What does matter is that the highest numbered page is 5.) A memory address request with a page number of 6 is ignored by the address registers in the central processing unit memory. The subtractor within the address modification apparatus subtracts M, or 5, from 6 and passes the modified page number of 1 to the address register controlling the auxiliary memory. The auxiliary memory then locates the appropriate memory location on the page therein numbered 1. Thus it is seen that memory requests directed toward the auxiliary memory (those with a page number exceeding 5) are ignored by the memory in the central processing unit and are converted by the address modification apparatus of this invention to addresses processed by that apparatus having page numbers beginning with 1. Thus this invention makes available auxiliary memories in which several pages of memory are controlled by a single address register. The subject interface apparatus permits such auxiliary memories to be coupled directly to an existing central processing unit without modification of the address registers within the central processing unit or the address register within the auxiliary memory.

This invention also features a selector circuit including a comparator that supplies an activating signal to initiate operation of the auxiliary memory if the modified page number is greater than 0 but less than N+1 (less than or equal to N). Such a modified page number indicates, of course, that the page called for in the original memory address is one of the auxiliary memory pages. In the absence of the activating signal, the auxiliary memory remains nonresponsive. Thus, the auxiliary memory ignores memory requests that concern memory locations not contained therein.

This invention also features a synchronizing logic circuit with a gate for receiving the activate signal. A delay apparatus, also within the synchronizing logic circuit, delays commands coming from the central processing unit for a predetermined time. After the predetermined period of time has expired, the delay circuit provides a signal that opens the gate to permit the activate signal to pass to the auxiliary memory. The delay time insures that the comparator output has settled. Furthermore, an inhibit circuit within the synchronizing logic circuit inhibits the gate in response to a busy signal from the auxiliary memory. Thus, in summary, the synchronizing logic circuit insures that the auxiliary memory is not activated falsely by fluctuations in the output of the comparator and that the activate signal will not be passed to the auxiliary memory while a busy signal is being received therefrom.

DESCRIPTION OF A PREFERRED EMBODIMENT

Figure 1A:
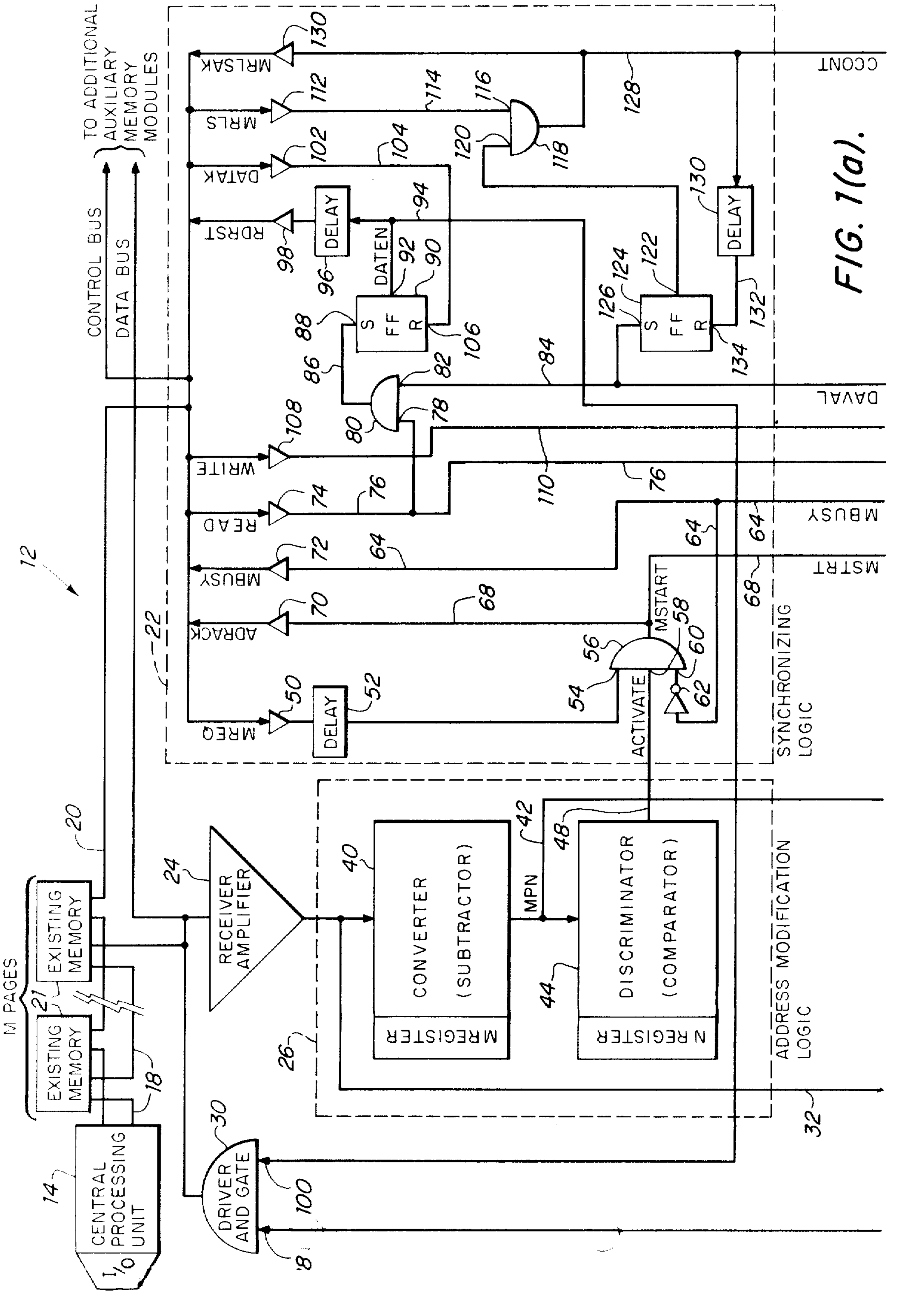
Figure 1B:
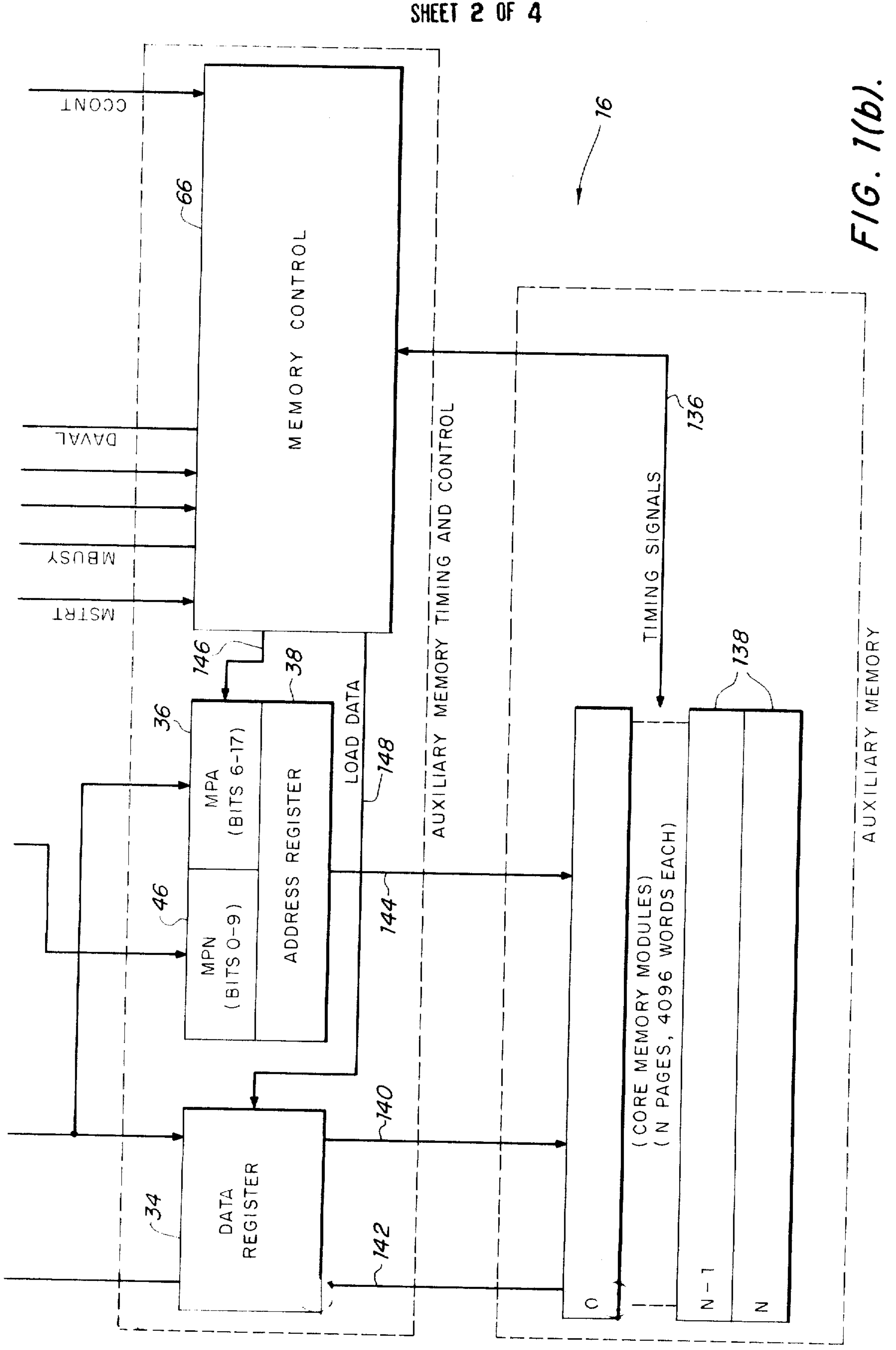
Figure 2A:
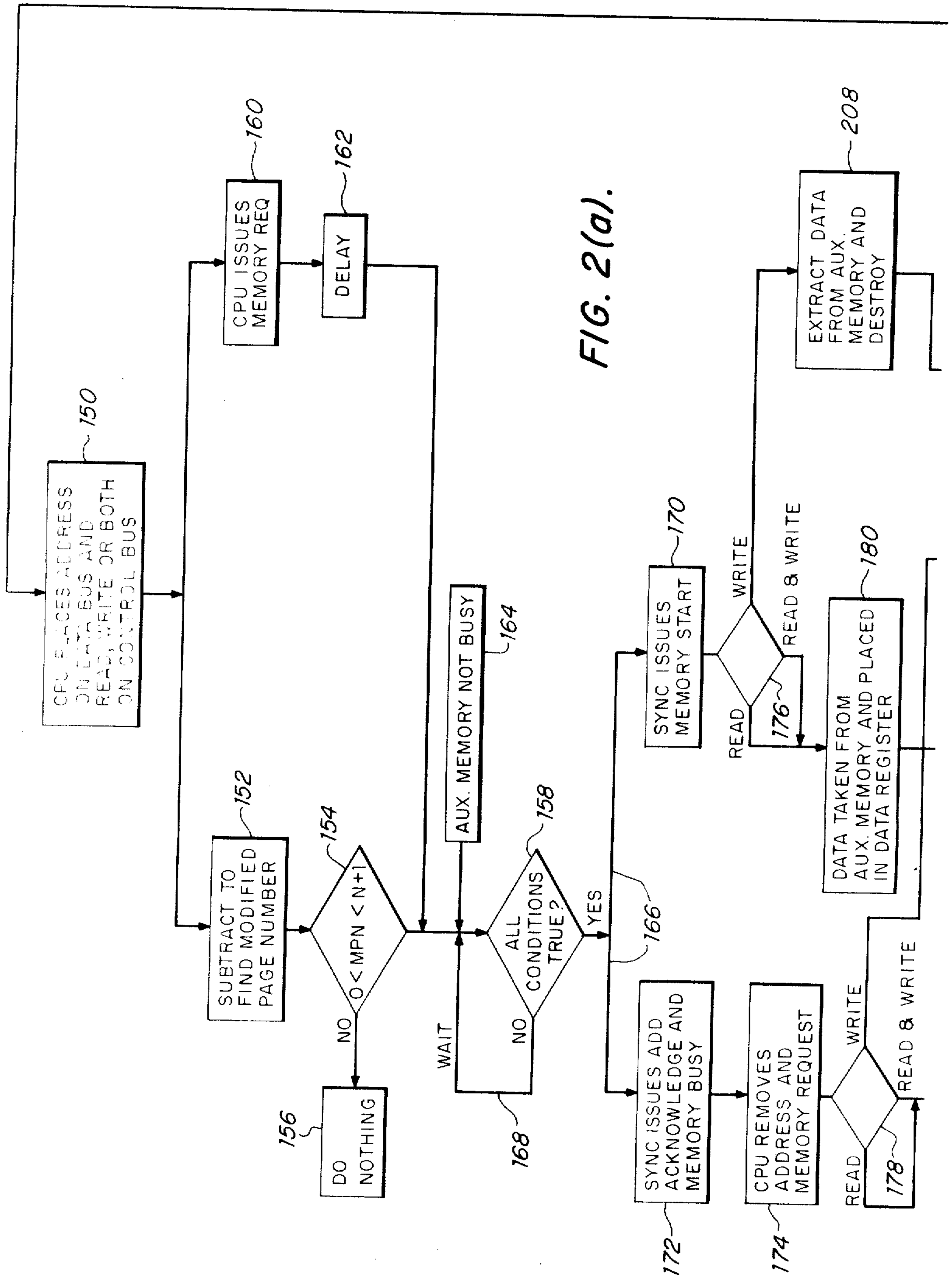
Figure 2B:
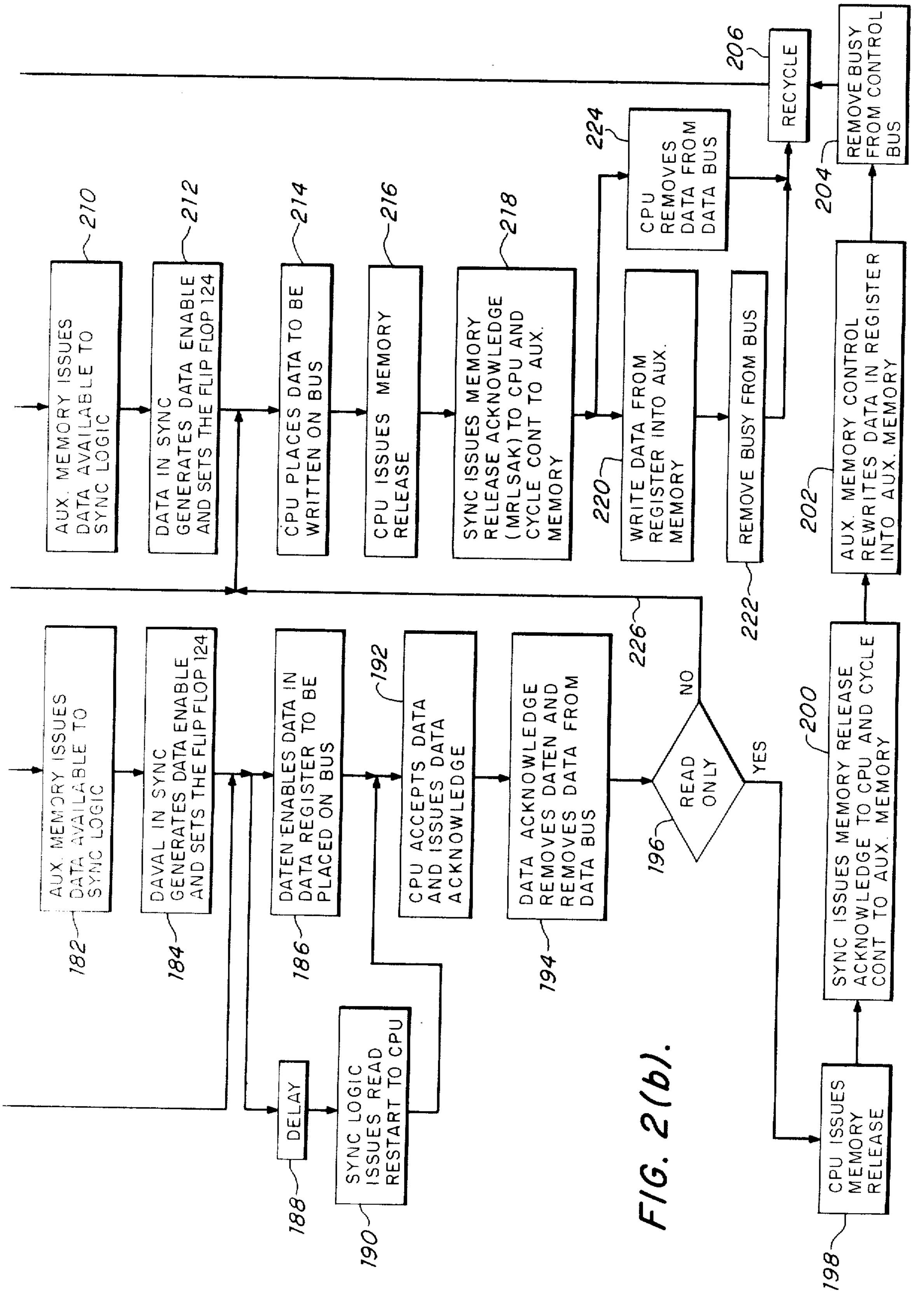

Other objects, features and advantages will occur from the following description of a preferred embodiment of the invention and the accompanying drawings wherein:

FIGS. 1(*a*) and (*b*) together schematically illustrate an interface apparatus coupling an auxiliary memory to a central processing unit; and FIGS. 2(*a*) and (*b*) together comprise a flow chart illustrating the operation of the system of FIGS. 1(*a*) and (*b*).

Referring first to FIGS. 1(*a*) and (*b*) there is shown an interface apparatus 12 coupling a central processing unit 14 to an auxiliary memory 16 including N pages.

More specifically, a memory data bus 18 and a memory control bus 20 couple M pages of existing memory 21 to the central processing unit 14. In addition, the two buses 18 and 20 couple the interface apparatus 12 to the central processing unit 14. The memory data bus 18 comprises 18 bidirectional lines and the memory control bus 20 comprises nine lines.

The memory control bus 20 is coupled to a synchronizing logic circuit 22 within the interface apparatus 12 and the memory data bus 18 is coupled by receiver amplifiers 24 to an address modification system 26. Each bit of information flowing from the auxiliary memory apparatus 16 to the bus 18 is fed to an input 28 of a driver AND gate 30. A set of lines 32 couple the output of the amplifier 24 directly to both a data register 34 and a modified page address (MPA) portion 36 of an address register 38 within the auxiliary memory 16. The page number portions of addresses flowing from the amplifier 24 are fed to a converter 40 in which the page address is operated on to yield modified page numbers on address lines 42. The modified page numbers are delivered by these lines 42 to discriminator 44 within the address modification apparatus 26 and to a modified page number (MPN) responsive portion 46 of the address register 38. The discriminator 44, in response to a modified page number of greater than 0 and less than N+1, provides an activate signal to the synchronizing logic circuit 22 on a line 48. In preferred embodiments converter 40 may be a subtractor which subtracts the number M of pages in existing memory from the address presented and discriminator 44 may be a selective comparator which responds to a modified page number of greater than 0 and less than N+1.

Within the synchronizing logic apparatus 22, memory requests (MREQ) are fed through an amplifier 50 to a delay circuit 52 and thence to an input 54 of an AND gate 56. The signal on line 48 is applied to another input 58 of the gate 56. A final input 60 of gate 56 is coupled to an inhibit inverter 62 that receives a busy signal on a line 64 from a memory control unit 66 in the auxiliary memory apparatus 16 when the auxiliary memory is busy. The memory busy signal on the line 64 is also coupled by an amplifier 72 to the bus 20. The output of the gate 56 is passed on a line 68 through an amplifier 70 to the memory control bus 20 as an address acknowledge (ADRACK) signal. The output of the gate 56 is also delivered on the line 68 to the memory control 66 as a memory start (MSTRT) signal. Read signals on the bus 20 are passed by an input amplifier 74 to bus 76 and thence to the memory control 66 and to an input 78 of a read AND gate 80. The other input 82 of the AND gate 80 receives a data available (DAVAL) signal on a line 84 from the memory control 66. In the read mode the presence of the data available signal indicates that the data from the selected memory position is in the register 34 and in the write mode, the signal indicates that the selected memory location and the data register 34 are clear. A line 86 delivers the output of the read AND gate 80 to the set input 88 of a data enable flip flop 90. The one output 92 of the data enable flip flop 90 is coupled by a line 94 to a delay circuit 96 and thence to an amplifier 98 that supplies a read restart (RDRST) signal to the bus 20. Also, the line 94 supplies a data enable (DATEN) signal to the other input 100 of the AND gate 30 to open the gate 30. Data acknowledge (DATAK) signals received from the bus 20 are passed by an input amplifier 102 and a reset line 104 to the reset terminal 106 of the data enable flip flop 90. Write signals received from the bus 20 are passed by an input amplifier 108 and a line 110 to the memory control 66. Memory release (MRLS) signals received from the memory control bus 20 are passed by an input amplifier 112 and a line 144 to an input 116 of another AND gate 118. The other input 120 of the gate 118 is coupled to the one output 122 of a write flip flop 124. The set input 126 of the flip flop 124 is coupled to the line 84. Memory release acknowledge (MRLSAK) signals at the output of the gate 118 are carried by a line 128 to an output amplifier 130 and thence to the memory bus 20. The line 128 also carries the output of the gate 118 to the auxiliary memory control 66 as a cycle continue (CCONT) signal and activates an automatic reset delay circuit 130 that is coupled by a line 132 to the reset terminal 134 of the write flip flop.

Within the auxiliary memory apparatus 16 a bus 136 couples timing signals between the auxiliary memory control 66 and N pages 138 auxiliary memory. Input and output lines 140 and 142, respectively, couple the N pages 138 to the data register 34. An address bus 144 couples the address register 38 to the N pages 138. Control lines 146 and 148 couple the address register 38 and the data register 34 to the auxiliary memory control 66. Operation of the interface apparatus 12 and the auxiliary memory 16 of FIG. 1 (*a*) and 1 (*b*) is best explained with reference to the flow chart depicted in the FIGS. 2 (*a*) and 2 (*b*). Operation is initiated when the central processing unit 14 places an address on the data bus 18 and a read or a write signal or both on the control bus 20 as depicted by the block 150. The subtractor 40 next determines the modified page number as represented by a block 152. If the modified page number does not meet the requirements imposed thereon by the comparator 44, indicating that the address in question is not within the auxiliary memory 16, the interface apparatus does nothing, blocks 154 and 156. However, if the requirements are met, the activate signal is delivered to the AND gate 56 as depicted by the block 158. The central processing unit 14 has also issued a memory request signal that soon passes through the delay circuit 52 as represented by the blocks 160 and 162. The output of the block 162 leads to the block 158 just as the output of the delay circuit 52 leads to the AND gate 56. If the inverter 62 supplies a signal indicative that the auxiliary memory 16 is not busy, as represented by the block 164, operation proceeds on a line 166 from the block 158. In the event that all the conditions are not met, the AND gate waits as indicated by the line 168. In response to the output from the AND gate 56 the synchronizing logic 22 issues a memory start signal on the line 68, as represented by the block 170, and address acknowledge and memory busy signals, as shown by the block 172. In response to the address acknowledge signal, the central processing unit 14 removes the address and memory request signals as shown by a block 174. In the FIGS. 2, the output of the blocks 170 and 174 are delivered to the blocks 176 and 178, respectively. In the blocks 176 and 178 the nature of the command given by the computer 14 to the auxiliary memory apparatus 16 must be determined. This operation is performed within the memory control unit 66.

Assume that the instruction was a read command. In that event, the data in the selected memory location is taken from the auxiliary memory 138 and placed in the data register 34 as indicated by a block 180. When the data is in the data register 34 the data available signal is placed on the line 84 as shown by a block 182. The data available signal, combined with the read signal on the line 76, produces an output from the read AND gate 80 on the line 86 to set the data enable flip flop 90. Thus the data enable signal is produced on the line 94. Also, as shown by a block 184, the flip flop 124 is set. The data enable signal on the line 94 opens the gate 30 and thus the data from the register 34 passes to the data bus 18. The above operation is indicated by a block 186. After a delay in the delay circuit 96, represented by a block 188, the data enable signal passes through the amplifier 98 to become the read restart signal on the control bus as shown by a block 190. In response to the read restart signal, the central processing unit 14 accepts the data and issues a data acknowledge signal to the line 104 to reset the flip flop 90. These operations are indicated in FIG. 2 by blocks 192 and 194. When the data enable signal is removed from the line 94 the gate 30 closes and the data register 34 is disconnected from the data bus 18.

At this point, the data from the selected memory location has been read into the central processing unit 14 in response to the read command. Now, the decision must be made whether the command on the control bus 20 was a read, or a read/write. This decision is made by the central processing unit 14 and the memory control 66. Assume that the command was only a read. The central processing unit 14, having received the appropriate data, issues a memory release signal that is passed by the amplifier 112 to open the gate 118. See blocks 196 and 198. Consequently, an output is produced on the line 128 when the memory release signal appears. Thus, the cycle continue signal is delivered to the auxiliary memory control 66 and the memory release acknowledge signal is delivered to the central processing unit 14. These operations are indicated by a block 200. In response to the cycle continue signal, the auxiliary memory circuit 66 rewrites the data in the data register 34 in the selected memory location within the memory bank 138 as indicated by a block 202 in FIG. 2. The cycle continue signal also resets the flip flop 124 following a short delay. Next, the busy signal is removed from the control bus 20 and the system recycles and awaits the following command as indicated by blocks 204 and 296.

Assume now that the command delivered on the control bus 20 was a write signal. Operation begins as before and if the conditions required by the comparator 44 are met and the memory is not busy, the synchronous logic 22 issues the memory start signal as shown by the block 170. Now, however, the path in FIG. 2 proceeds from the block 176 to a block 208 that indicates that the data from the selected memory location is taken therefrom and destroyed. When the data is removed from the memory 138 and destroyed, the auxiliary memory issues the data available signal on the line 84 to the synch logic 22 as shown by the block 210. The data available signal in the logic 22 sets the flip flops 90 and 124 as shown by the block 212. In response to receiving the address acknowledge signal, the central processing unit 14 places the data to be written on the data bus 18 and issues a memory release signal on the control bus 20 as indicated by the blocks 214 and 216. Inasmuch as the flip flop 124 is set, the gate 118 is open and the sync logic 22 issues the memory release acknowledge signal and passes a cycle continue signal on the line 128 to the external memory control 66. This is indicated by a block 218. In response to the cycle continue signal, the writing operation is initiated and the data from the data bus is loaded into the data register 34 and is written in the selected location in the memory 138. Next, the central processing unit 14 removes the data from the data bus 18 and the control unit 66 removes the busy signal. This is indicated by blocks 220, 222 and 224. The system now recycles as indicated by the block 206 and is ready to receive the next command.

If the signals initially placed on the control bus 20 include a read signal and a write signal, the process follows that described with respect to the read command until the data is read from the data register 34 to the central processing unit 14. At that time, in response to the simultaneous receipt of read and write signals, the memory control 66 will destroy the data in the register 34 and the central processing unit 14 will place the data to be written on the data bus 18. This is indicated in the FIG. 2 by a line 226 connecting the block 196 to the block 214. Proceeding from the block 214 in the FIG. 2 it is seen that the remaining portion of the read/write operation proceeds precisely as did the conclusion of the write operation. The difference between the two operations is as follows: in the read/write mode, data is removed from the memory 138 and placed in data register 34. Following the read operation, the data in the register 34 is destroyed and new data is placed therein. Finally, the new data in the register 34 is written into the memory 138. In the write operation, the data from the selected location is removed from the memory 138 and is destroyed and the writing process follows immediately thereafter.

Many modifications and variations of the present invention are possible in light of the above teachings. For example, the true significance of M is not that it is the number of pages in the central processing unit memory, but rather that it is the highest numbered memory page. Thus, if a central processing unit contains four pages of memory numbered 0, 1, 2 and 3 then M is 3. It is to be understood, therefore, that the invention can be practiced otherwise than as specifically described.

Other embodiments will occur to those skilled in the art and are within the following claims:

What is claimed is:

1. Interface apparatus for coupling an auxiliary memory containing N pages to a central processing unit having M pages of memory; said interface apparatus comprising address modification means for transferring memory addresses from the central processing unit to the auxiliary memory, said address modification means comprising subtractor means for subtracting M from the page number portion of the memory addresses during transfer to provide modified page numbers to which the auxiliary memory responds.

2. Interface apparatus according to claim 1 comprising selector means for enabling operation of the auxiliary memory in response to the receipt of a memory address corresponding to a memory location within the auxiliary memory.

3. Interface apparatus according to claim 2 wherein said selector means comprises comparator means for receiving the modified page numbers from said subtractor means and providing an activate signal in response to modified page numbers of less than N+1.

4. Interface apparatus according to claim 3 comprising synchronizing logic means for coupling the commands of the central processing unit to the auxiliary memory, said synchronizing logic means comprising delay means for inhibiting the operation of the auxiliary memory for a preselected time following the receipt of a command by said synchronizing logic means.

5. Interface apparatus according to claim 4 wherein said synchronizing logic means comprises gate means operatively coupled to said comparator means for initiating operation of the auxiliary memory following the expiration of the preselected time and receipt of the activate signal.

6. Interface apparatus according to claim 5 wherein said synchronizing logic means comprises inhibit means coupled to said gate means and the auxiliary memory for inhibiting the operation of said gate means in response to a busy signal from the auxiliary memory.

7. Interface apparatus for coupling an auxiliary memory containing N pages to a central processing unit already including pages of memory numbered up to M, said apparatus comprising:

address modification means for transferring memory addresses from the central processing unit to the auxiliary memory and including:

subtractor means for subtracting M from the page number portions of the memory addresses to provide modified page numbers to which the auxiliary memory responds;

comparator means for providing an activate signal in response to modified page numbers of greater than zero and less than N+1;

synchronizing logic means comprising:

delay means for inhibiting the operation of the auxiliary memory for a preselected time following the receipt of a command by said synchronizing logic means;

gate means operatively coupled to said comparator means for initiating operation of the auxiliary memory following the preselected time and receipt of the activate signal; and inhibit means for inhibiting the operation of said gate means in response to a busy signal from the auxiliary memory.

8. Interface apparatus according to claim 7 wherein said synchronizing logic means further comprises read gating means responsive to read commands from the central processing unit and enabling signals from the auxiliary memory for coupling a data register in the auxiliary memory to the central processing unit.

9. Interface apparatus according to claim 8 wherein said read gating means comprises reset means for disconnecting the data register from the central processing unit in reponse to a data acknowledge signal from the central processing unit.

10. Interface apparatus according to claim 9 wherein said synchronizing logic means further comprises write means responsive to an enable signal from the auxiliary memory and a memory release signal from the central processing unit for setting to cause the auxiliary memory to write the contents of a data register in the auxiliary memory into a preselected memory location.

11. Interface apparatus according to claim 10 wherein said write means comprises reset means for resetting said write means.

12. Interface apparatus according to claim 11 wherein said reset means comprises automatic delay reset means for automatically resetting said write means after a predetermined set time.

13. Auxiliary memory apparatus for use in conjunction with a central processing unit already including pages of memory numbered up to M, said apparatus comprising:

auxiliary memory means comprising N pages of auxiliary memory;

a data register for use in conjunction with said N pages;

an address register for use in conjunction with said N pages;

address modification means for transferring memory addresses from the central processing unit to said address register and comprising subtractor means for subtracting M from the page number portion of the memory addresses to provide modified page numbers which are delivered to said address register;

comparator means for providing an activate signal in response to modified page numbers of greater than zero and less than N+1;

synchronizing logic means comprising delay means for inhibiting the operation of said auxiliary memory means for a preselected time following the receipt of a command by said synchronizing logic means;

gate means operatively coupled to said comparator means for intiating operation of said auxiliary memory means following the preselected time and receipt of the activate signal; and inhibit means for inhibiting the operation of said gate means in response to a busy signal from said auxiliary memory means.

14. Auxiliary memory apparatus according to claim 13 wherein said synchronizing logic means further comprises read gating means responsive to read commands from the central processing unit and enabling signals from said auxiliary memory means for coupling said data register to the central processing unit.

15. Auxiliary memory apparatus according to claim 14 wherein said read gating means comprises reset means for disconnecting said data register from the central processing unit in response to a data acknowledge signal from the central processing unit.

16. Auxiliary memory apparatus according to claim 15 wherein said synchronizing logic means further comprises write means responsive to an enable signal from said auxiliary memory means and a memory release signal from the central processing unit for setting to cause said auxiliary memory means to write the contents of said data bus and data register into the preselected memory location.

17. Auxiliary memory apparatus according to claim 16 wherein said write means comprises reset means for resetting said write means.

18. Auxiliary memory apparatus according to claim 17 wherein said reset means comprises automatic delay reset means for automatically resetting said write means after a preselected set time.

19. Auxiliary memory apparatus according to claim 18 wherein N is greater than one.

20. Interface apparatus for coupling an auxiliary memory containing N pages to a central processing unit already including pages of memory numbered up to M, said apparatus comprising:

address modification means for transferring memory addresses from the central processing unit to the auxiliary memory and including;

means for determining whether the page number portions of the memory addresses exceed M for providing an activate signal in response to modified page numbers of greater than zero and less than N+1 and providing modified page numbers to which the auxiliary memory responds;

comparator means and synchronizing logic means for enabling operation of the auxiliary memory following the receipt of the activate signal.

* * * * *